F. RAYMOND.
Swinging-Gate.
No. 160,842. Patented March 16, 1875.
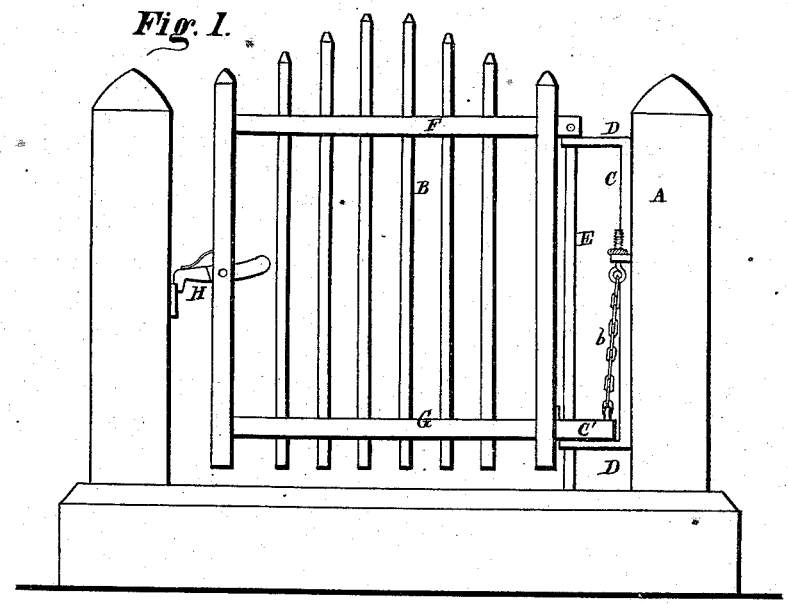
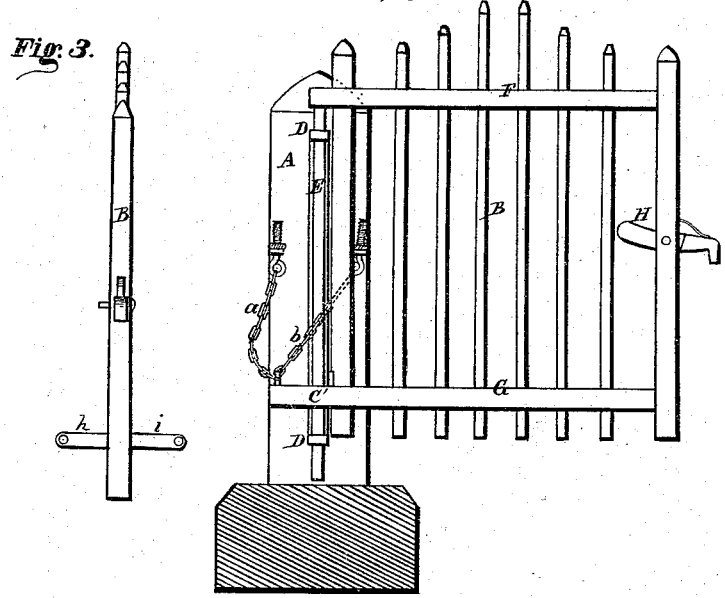

UNITED STATES PATENT OFFICE.

FITCH RAYMOND, OF CLEVELAND, OHIO.

IMPROVEMENT IN SWINGING GATES.

Specification forming part of Letters Patent No. 160,842, dated March 16, 1875; application filed January 11, 1875.

*To all whom it may concern:*

Be it known that I, FITCH RAYMOND, of Cleveland, in the county of Cuyahoga and State of Ohio, have invented a certain new and Improved Fence-Gate, of which the following is a full, clear, and complete description, reference being had to the accompanying drawings, making part of this specification, in which—

Figure 1 is a side elevation of the gate when closed. Fig. 2 is a view of the gate opened. Fig. 3 is an end view of the gate.

Like letters of reference refer to like parts in the several views.

The nature of this invention relates to an improvement in devices for automatically closing swinging gates, as will hereinafter be more fully described.

In the drawings, A represents the gate-post, to which the gate B is hung, as follows: To the post is secured a bracket, C, to the projecting arms D of which the gate is hung by the rod E passing through the arms, and through the upper and lower rails F G of the gate, as shown in Fig. 1, in which it will be seen that the bar G projects beyond the gate, forming an arm, C'. To said arm C' is attached the lower ends of the chains $a$ $b$. The upper ends of the chains are spread apart and adjustably attached to eyes in the post, as shown in Fig. 2.

The operation of the chains for closing the gate is as follows: On pushing open the gate, as shown in Fig. 2, the arm C' draws the chain $b$ out laterally from its position shown in Fig. 1 to that shown in Fig. 2. This lateral movement of the chain lifts the gate upward from its position shown in Fig. 1 to that shown in Fig. 2, which represents the gate as open. The gate, on being left free, will swing back, by virtue of its hanging upon the laterally-extended chain, thereby causing the chain to assume its original position, shown in Fig. 1, The gate is so hung as to swing either way; hence the application thereto of two chains, both of which act alike, in combination with the gate, respectively, as to which way the gate is opened.

The particular advantages of a gate being closed by the means described is, that it is self-shutting; hence no care is needed to close it on passing through. The momentum of the gate on swinging to causes the latch H to fall into the catch, thereby making the gate self-fastening. The lifting up of the gate, on opening, allows it to swing clear of obstructions of ice, snow, and rise of ground.

The purpose of the arms $h$ $i$ is to allow the gate to be hung on either edge of the post, so that it may swing open one way only.

What I claim as my invention, and desire to secure by Letters Patent, is—

The adjustable chains $a$ $b$, attached to a projection of the bottom rail of the gate B, and also to the post A, in combination with the bracket C D, and rod E, for the purpose of automatically closing the gate, as set forth.

FITCH RAYMOND.

Witnesses:
W. H. BURRIDGE,
A. F. CORNELL.